(12) United States Patent
Patole et al.

(10) Patent No.: US 9,784,828 B2
(45) Date of Patent: Oct. 10, 2017

(54) FMCW DOPPLER PROCESSING ALGORITHM FOR ACHIEVING CW PERFORMANCE

(71) Applicant: TEXAS INSTRUMENTS INCORPORATED, Dallas, TX (US)

(72) Inventors: Sujeet Milind Patole, Richardson, TX (US); Anand Dabak, Plano, TX (US); Lei Ding, Plano, TX (US)

(73) Assignee: TEXAS INSTURMENTS INCORPORATED, Dallas, TX (US)

( * ) Notice: Subject to any disclaimer, the term of this patent is extended or adjusted under 35 U.S.C. 154(b) by 260 days.

(21) Appl. No.: 14/836,521

(22) Filed: Aug. 26, 2015

(65) Prior Publication Data

US 2016/0061947 A1    Mar. 3, 2016

Related U.S. Application Data

(60) Provisional application No. 62/042,511, filed on Aug. 27, 2014.

(51) Int. Cl.
*G01S 13/58* (2006.01)
*G01S 7/35* (2006.01)
*G01S 13/34* (2006.01)

(52) U.S. Cl.
CPC ............ *G01S 13/584* (2013.01); *G01S 7/352* (2013.01); *G01S 13/343* (2013.01)

(58) Field of Classification Search
CPC ....... G01S 13/584; G01S 13/343; G01S 7/352
See application file for complete search history.

(56) References Cited

U.S. PATENT DOCUMENTS

| | | | | |
|---|---|---|---|---|
| 6,606,052 | B1* | 8/2003 | Miyahara | G01S 13/343 342/107 |
| 2005/0156780 | A1* | 7/2005 | Bonthron | G01S 3/48 342/107 |
| 2010/0271258 | A1* | 10/2010 | Takabayashi | G01S 13/345 342/107 |
| 2011/0122013 | A1* | 5/2011 | Takeya | G01S 13/44 342/109 |
| 2015/0338505 | A1* | 11/2015 | Oshima | G01S 7/28 342/107 |
| 2016/0061947 | A1* | 3/2016 | Patole | G01S 13/584 342/109 |
| 2016/0245911 | A1* | 8/2016 | Wang | G01S 13/72 |
| 2017/0115386 | A1* | 4/2017 | Morinaga | G01S 13/584 |

* cited by examiner

*Primary Examiner* — John B Sotomayor
(74) *Attorney, Agent, or Firm* — John R. Pessetto; Charles A. Brill; Frank D. Cimino

(57) ABSTRACT

A frequency modulated continuous wave (FMCW) radar system that includes a transceiver coupled to an analog to digital converter (ADC), and a digital signal processor (DSP) coupled to the ADC. The transceiver is configured to transmit a plurality of FMCW chirps, receive a plurality of reflected FMCW chirps, and mix the reflected FMCW chirps with at least one of the FMCW chirps to generate a plurality of beat signals. The reflected FMCW chirps are the FMCW chirps after being reflected off of a target object. The ADC is configured to convert the beat signals into a plurality of digital chirps. The DSP is configured to receive the digital chirps and quantify a relative velocity of the target object as compared to a velocity of the FMCW radar system by removing an effect of a range to the target object from a two dimensional range Doppler processing signal.

20 Claims, 3 Drawing Sheets

FMCW DOPPLER PROCESSING ALGORITHM FOR ACHIEVING CW PERFORMANCE

CROSS-REFERENCE TO RELATED APPLICATIONS

The present application claims priority to U.S. Provisional Patent Application No. 62/042,511, filed Aug. 27, 2014, titled "FMCW Doppler Processing Algorithm for Achieving CW Performance," which is hereby incorporated herein by reference in its entirety.

BACKGROUND

Frequency modulated continuous wave (FMCW) radar, sometimes known as continuous wave frequency modulated (CWFM) radar, is a radar system capable of determining distance to a target object. In a FMCW radar system, a modulated (i.e., frequency varied over a fixed period of time) continuous wave signal is transmitted, reflected off of a target object, and received by the system. The received signal is mixed with the transmitted signal to produce a beat signal. Because the frequency difference between the transmitted signal and the received signal increases with time or distance, demodulation of the beat signal provides a distance (i.e., range) to the target object.

Continuous wave (CW) radar is similar to FMCW radar, except that the continuous wave signal transmitted is not modulated (i.e., the frequency is fixed). CW radar utilizes the Doppler shift to determine velocity information about a target object. In other words, CW radar is capable of estimating the Doppler frequency of reflected signals to determine velocity of a target object. However, a CW radar is incapable of determining the range to the target object.

SUMMARY

The problems noted above are solved in large part by systems and methods for quantifying a velocity of a target object utilizing frequency modulated continuous wave radar. In some embodiments, a frequency modulated continuous wave (FMCW) radar system includes a transceiver coupled to an analog to digital converter (ADC), and a digital signal processor (DSP) coupled to the ADC. The transceiver is configured to transmit a plurality of FMCW chirps, receive a plurality of reflected FMCW chirps, and mix the plurality of reflected FMCW chirps with at least one of the plurality of FMCW chirps to generate a plurality of beat signals. The plurality of FMCW chirps are the plurality of FMCW chirps after being reflected off of a target object. The ADC is configured to convert the plurality of beat signals into a plurality of digital chirps. The DSP is configured to receive the plurality of digital chirps and quantify a relative velocity of the target object as compared to a velocity of the FMCW radar system by removing an effect of a range to the target object from a two dimensional range Doppler processing signal.

Another illustrative embodiment is a method for quantifying a velocity of a target object utilizing FMCW radar. The method may comprise transmitting, by a transceiver in a FMCW radar system, a plurality of FMCW chirps. The method also comprises receiving, by the transceiver, a plurality of reflected FMCW chirps. The plurality of reflected FMCW chirps include the plurality of FMCW chirps after being reflected off of the target object. The method also includes generating a two dimensional range Doppler processing signal. The method also comprises quantifying the velocity of the target object relative to a velocity of the transceiver by removing an effect of a range to the target object from the two dimensional range Doppler processing signal.

Yet another illustrative embodiment is a digital signal processor (DSP) that includes a receiving unit coupled to a demodulation unit. The receiving unit is configured to receive a plurality of digital chirps corresponding to a plurality of beat signals. The demodulation unit is configured to generate a two dimensional range Doppler processing signal corresponding to a range to the target object. The demodulation unit is also configured to quantify a velocity of the target object relative to a velocity of the DSP by removing an effect of the range to the target object from the two dimensional range Doppler processing signal.

BRIEF DESCRIPTION OF THE DRAWINGS

For a detailed description of various examples, reference will now be made to the accompanying drawings in which.

NOTATION AND NOMENCLATURE

Figure 1:
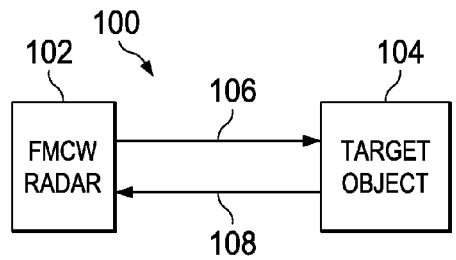
FIG. 1 shows a block diagram of a frequency modulated continuous wave (FMCW) radar system in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Frequency modulated continuous wave (FMCW) radar, sometimes known as continuous wave frequency modulated (CWFM) radar, is a radar system capable of determining distance to a target object. A FMCW radar system transmits a modulated (i.e., frequency varied over a fixed period of time) continuous wave signal which reflects off of a target object. The reflected signal is then received by the system. The received signal is mixed with the transmitted signal to produce a beat signal. Because the frequency difference between the transmitted signal and the received signal increases with time or distance, demodulation of the beat signal provides a distance (i.e., range) to the target object.

In a conventional FMCW radar system, further signal processing may also allow the system to determine and/or estimate the Doppler shift of the received signal. In order to estimate the Doppler shift, the mixed output of the received signal and the transmitted output is range gated. This process is repeated for a number of consecutive chirps to obtain the variation in phase of the signals to produce the Doppler frequency. This, in turn, allows the system to estimate the velocity of the target object. However, in the process of range gating the mixed signal, the number of samples utilized to estimate the Doppler shift is reduced. Thus, the conventional FMCW radar system produces a reduced Doppler estimation performance, and thus, a reduced performance in quantifying the velocity of the target object.

Continuous wave (CW) radar is similar to FMCW radar, except that the continuous wave signal transmitted is not modulated (i.e., the frequency is fixed). CW radar utilizes the Doppler shift to determine velocity information about a target object. In other words, CW radar is capable of estimating the Doppler frequency of reflected signals to determine velocity of a target object. Each sample of the mixed signal (i.e., the transmitted signal mixed with the received signal), contains a constant phase term proportional to the range and the frequency proportional to the Doppler shift. Signal processing of this signal allows for an accurate estimation of the Doppler shift, and thus, the velocity of the target object. The CW radar system, assuming a sinusoidal tone frequency $f_c$, receives the reflected signal from the target object with a roundtrip time delay $$t_d = \frac{R + v\hat{t}}{c},$$

where R is the range to the target object, v is the velocity of the target object, and $\hat{t}$ is the continuous time parameter. The mixed output signal is:

$$b(\hat{t}) = e^{-j2\pi f_c \hat{t}} \times e^{j2\pi f_c(\hat{t}-t_d)} = e^{j4\pi f_c\left(\frac{R}{c}+\frac{v\hat{t}}{c}\right)}.$$

This signal is proportional to the Doppler shift.

The quantification of the target object's velocity utilizing a CW radar system is more accurate than the quantification of the velocity utilizing a conventional FMCW radar system. However, CW radar is incapable of determining the range to the target object. Therefore, in many applications (e.g., in automobiles), both a CW radar system, to quantify the velocity of the target object, and a FMCW radar system, to quantify the range to the target object, are included. However, it may be desirable to develop a FMCW radar system that provides the velocity quantification performance of CW radar. Thus, only one radar system, the FMCW radar system, is required to accurately quantify both range and velocity of a target object.

FIG. 1 shows a block diagram of a frequency modulated continuous wave (FMCW) radar system 100 in accordance with various embodiments. FMCW radar system 100 may include FMCW radar 102 and target object 104. FMCW radar 102 is configured to transmit a FMCW chirp 106 directed at target object 104. FMCW chirp 106 may be any signal that sweeps linearly from a lower to a higher frequency or from a higher to a lower frequency. FMCW chirp 106 may be in the form of a sinusoidal wave, a sawtooth wave, a triangle wave, a square wave, or any other type of signal that sweeps linearly from one frequency to either a higher or lower frequency. Reflected FMCW chirp 108 is FMCW chirp 106 after reflecting (or echoing) off of the target object 104. Reflected FMCW chirp 108 is received by FMCW radar 102. FMCW chirp 106 may be repeatedly transmitted by FMCW radar 102. In other words, a plurality of FMCW chirps 106 may be transmitted by FMCW radar 102. Accordingly, a plurality of reflected FMCW chirps 108 is received by FMCW radar 102. In some embodiments, the same number of reflected FMCW chirps 108 is received by FMCW radar 102 as the number of FMCW chirps 106 that are transmitted. Additionally, while only one target object 104 is depicted, two or more target objects 104 may be present in FMCW radar system 100.

Figure 2A:
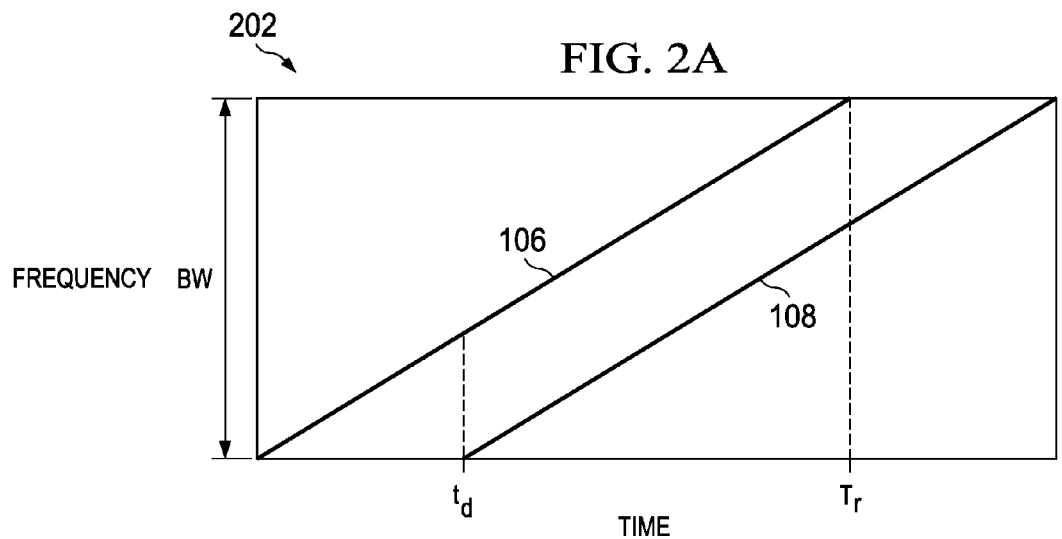
FIG. 2A shows an example frequency versus time graph for a frequency modulated continuous wave (FMCW) chirp and reflected FMCW chirp in accordance with various embodiments.

FIG. 2A shows an example frequency versus time graph 202 for FMCW chirp 106 and reflected FMCW chirp 108 in accordance with various embodiments. In graph 202, FMCW chirp 106 is a linearly sweeping modulated signal that sweeps from a lower frequency to a higher frequency from the time of transmission through ramp time $T_r$ across bandwidth BW. In the example shown in graph 202, the frequency of FMCW chirp 106 increases through the chirp while in alternative embodiments, FMCW chirp 106 may sweep from a higher frequency to a lower frequency. In this example, the slope of modulation for FMCW chirp 106 is:

$$K = \frac{BW}{T_r}.$$

Hence FMCW chirp 106 may be defined as:

$$s(t) = e^{j2\pi(f_c + 0.5Kt)t}$$

which may also be expressed as:

$$s(t) = e^{j(2\pi f_c t + \pi K t^2)}$$

for $0 < t < T_r$ where $f_c$ is the instantaneous frequency at fast time t within FMCW chirp 106. In some embodiments the bandwidth BW for FMCW chirp 106 may be relatively wide (e.g., 1 GHz or 4 GHz). Additionally, FMCW chirp 106 may be transmitted at a relatively high frequency (e.g., 24 GHz or 76 GHz). Thus, FMCW chirp 106 may sweep, for example, from 76 GHz to 80 GHz.

Similar to FMCW chirp 106, reflected FMCW chirp 108 sweeps, in an embodiment, from a lower frequency to a higher frequency from the time of transmission. However, reflected FMCW chirp 108 is displaced in time $t_d$ relative to FMCW chirp 106 by the time it takes to travel from FMCW radar 102 to target object 104 and back to FMCW radar 102. Therefore, reflected FMCW chirp 108 may be defined as:

$$r(t) = e^{j2\pi(f_c + 0.5K(t-t_d))(t-t_d)}$$

which may also be expressed as:

$$r(t) = e^{j(2\pi f_c(t-t_d) + \pi K(t-t_d)^2)}$$

for $0 < t < T_r$, where $f_c$ is the instantaneous frequency at fast time t.

Figure 2B:
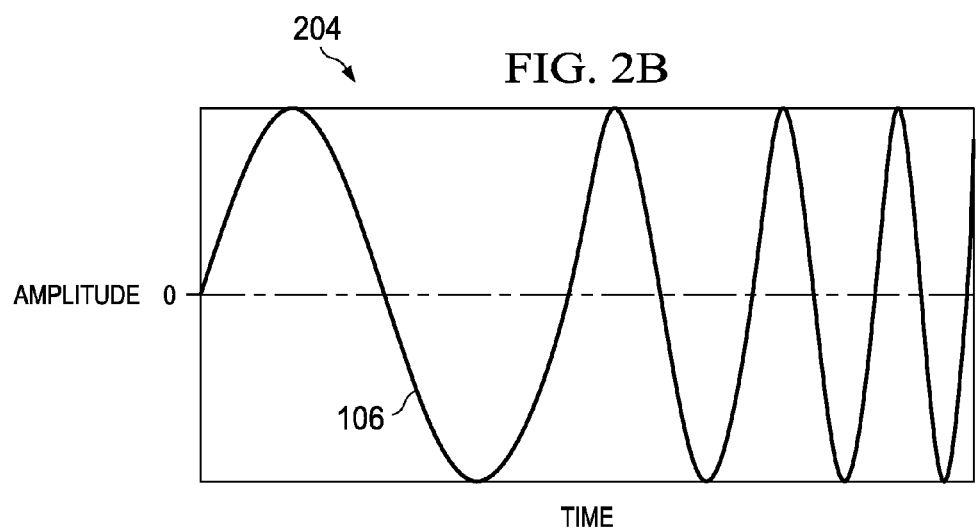
FIG. 2B shows an example amplitude versus time graph for a FMCW chirp and reflected FMCW chirp in accordance with various embodiments.

FIG. 2B shows an example amplitude versus time graph 204 for FMCW chirp 106 in accordance with various embodiments. In graph 204, FMCW chirp 106 is a sinusoidal signal that maintains constant amplitude with a linearly increasing frequency. As mentioned previously, in alternative embodiments, FMCW chirp 106 may linearly decrease in frequency and may be a sawtooth wave, a triangle wave, a square wave, or any other type of signal. While not shown in FIG. 2B, reflected FMCW chirp 108 may have similar or the same amplitude characteristics as FMCW chirp 106.

Figure 3:
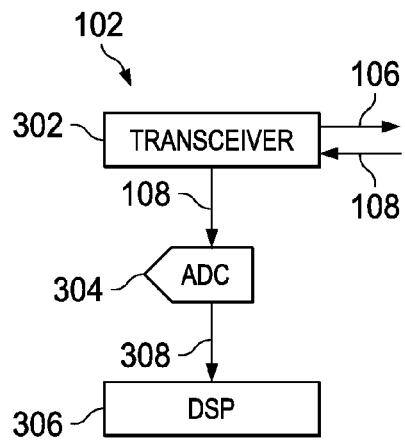
FIG. 3 shows a block diagram of a FMCW radar in accordance with various embodiments.

FIG. 3 shows a block diagram of FMCW radar 102 in accordance with various embodiments. FMCW radar 102 may include a transceiver 302, an analog-to-digital converter (ADC) 304, and a digital signal processor (DSP) 306. Transceiver 302 is configured to transmit FMCW chirp 106 directed at target object 104 and receive reflected FMCW chirp 108 from target object 104. Transceiver 302 may be any type of transceiver including a wired and/or wireless transceiver capable of transmitting and receiving FMCW chirps. Once the reflected FMCW chirp 108 is received by transceiver 302, the FMCW chirp 106 and reflected FMCW chirp 108 are mixed (i.e., multiplied). In some embodiments, this mixing is performed in the transceiver 302. After the FMCW chirp 106 and reflected FMCW chirp 108 are mixed, an analog filter may be utilized to filter out high frequency content in the mixed signal to create a beat signal b(t).

In some embodiments, the reflected FMCW chirp 108 is mixed with a conjugated version of the FMCW chirp 106 to create the beat signal. This may be termed as complex conjugate mixing. The beat signal may be expressed as:

$$b(t) = s(t)r^*(t).$$

By inserting the definition of s(t) and r(t), the beat signal may be expressed as:

$$b(t) \approx e^{j(2\pi K t_d t + 2\pi f_c t_d)}.$$

Utilizing the time displacement, the beat signal is expressed as:

$$b(t) = e^{j2\pi \left(2K\left(\frac{R+vt}{c}\right)t + 2f_c\left(\frac{R+vt}{c}\right)\right)}.$$

where R is the range to the target object 104 and c is the speed of light. Because the frequency modulation of the beat signal is small as compared to $$\frac{2KRt}{c},$$

the beat signal equation may be simplified to (i.e., because the range R is much larger than the vt within chirp measurement intervals, certain terms may be neglected). Neglecting the higher order $t^2$ terms, the beat signal may be expressed as:

$$b(t) \approx e^{-j2\pi\left(\left(\frac{2KR}{c} + \frac{2f_c v}{c}\right)t + \frac{2f_c R}{c}\right)}.$$

Thus, the beat signal is dependent on the range of the target object 104 as well as the Doppler shift. This beat signal then may be digitized by ADC 304 and the digital beat signal passed to DSP 306 for further processing. This process may be repeated for subsequent received reflected FMCW chirps 108. More specifically, the process of determining the beat signal is repeated over a certain number L consecutive received reflected FMCW chirps 108.

In other embodiments, only real signals are processed physically. In this embodiments, the real components of the transmitted FMCW chirp 106 may be expressed as:

$$s(t) = \text{real}(e^{j(2\pi f_c t + \pi K t^2)}) = \cos(2\pi f_c t + \pi K t^2)$$

while the real components of the reflected FMCW chirp 108 may be expressed as:

$$r(t) = \text{real}(e^{j(2\pi f_c(t-t_d) + \pi K(t-t_d)^2)}) = \cos(2\pi f_c(t-t_d) + \pi K(t-t_d)^2).$$

The real component of the beat signal (I) may be expressed as I=s(t)*r(t). This real component of the beat signal then may pass through a lowpass filter in order to remove high frequency mixing products or a bandpass filter in order to remove both high frequency mixing products and direct current (DC) frequency components created from the transmission and/or receiving of the FMCW chirp 106 and/or reflected FMCW chirp 108 that may create very low beat frequencies. The real component of the beat signal then may be digitized by ADC 304 and the digital beat signal passed to DSP 306. The imaginary component of the beat signal (Q) may be determined by first phase shifting s(t) by 90 degrees (or $\sin(2\pi f_c t + \pi K t^2)$). Then, s(t) may be multiplied by r(t). This imaginary component may then pass through a lowpass filter to remove high-frequency mixing products or a bandpass filter to remove both high-frequency mixing products and DC frequency components and then digitized by ADC 304.

ADC 304 may include any hardware that converts the analog beat signal into a digital signal for signal processing by DSP 306. ADC 304 is configured to the beat signal, which is in the form of an analog signal (i.e., a continuous time and continuous amplitude signal), from transceiver 302 and convert the signal into a digital representation (i.e., a discrete time and discrete amplitude signal) of the analog beat signal. The resulting digital signal, which in FIG. 3 is referred to as digital chirp 308, is then fed to DSP 306 for further processing. Because transceiver 302 may receive a plurality of reflected FMCW chirps 108 which are then mixed to create a plurality of beat signals, ADC 304 may be configured to convert each of the beat signals into a digital chirp 308. Because the beat signal may be represented utilizing complex numbers, in some embodiments, two ADCs 304 are employed in the FMCW radar 102, one to sample for real (I) components of the beat signal and the other to sample imaginary (Q) components of the beat signal. Utilizing the complex outputs of these two ADCs 304 allows for improved signal-to-noise (SNR) ratio of the beat signal. While shown located in FMCW radar 102, in some embodiments, ADC 304 is located at a location outside of FMCW radar 102.

DSP 306 is configured to demodulate the digital chirp 308 (the digitized version of the beat signal) and quantify the velocity of target object 104 as compared to the velocity of FMCW radar system 102 (i.e., the transceiver 302). For example, the FMCW radar system 102 may quantify the actual velocity of target object 104, so long as FMCW radar system 102 itself is not moving. In other embodiments, a relative velocity of target object 104 with respect to radar system 102 may be determined if FMCW radar system 102 is moving. In further embodiments, the actual velocity of target object 104 may be quantified even when radar system 102 is moving by determining the relative velocity of target object 104 with respect to radar system 102 and then accounting for the velocity and direction of movement of FMCW radar system 102. While shown located in FMCW radar 102, in some embodiments, DSP 306 is located at a location outside of FMCW radar 102.

Figure 4:
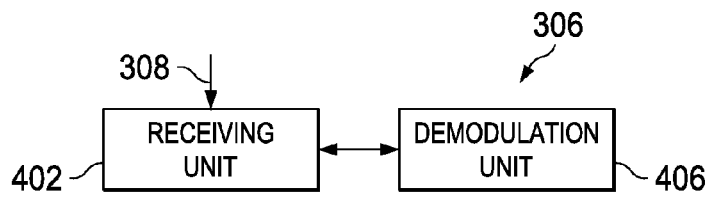
FIG. 4 shows a block diagram of a digital signal processor (DSP) used in a FMCW radar in accordance with various embodiments.

FIG. 4 shows a block diagram of DSP in accordance with various embodiments. DSP 306 may include a receiving unit 402 and a demodulation unit 406. The receiving unit 402 and demodulation unit 406 may be coupled to one another. The receiving unit 402 is configured to receive a plurality of digital chirps 308 from ADC 304. As discussed previously, digital chirps 308 are a digital representation of the beat signals.

Demodulation unit 406 is configured to receive each of the digital chirps 308 from receiving unit 402 and quantify the velocity of the target object 104 relative to radar system 102. As discussed previously, FMCW chirp 106 is represented by the signal $s(t)=e^{j2\pi(f_c+0.5Kt)t}$ while the reflected FMCW chirp 108 is represented by the signal $r(t)=e^{j2\pi(f_c+0.5K(t-t_d))(t-t_d)}$. The time displacement of reflected FMCW chirp 108 may be expressed as:

$$t_d = \frac{2(R+vt)}{c}$$

where R is the range to the target object 104, v is the relative velocity of target object 104 with respect to FMCW radar 102, and c is the speed of light. The Doppler shift of the reflected FMCW chirp 108 is expressed as:

$$f_d = \frac{2v}{\lambda}.$$

In order to calculate range and velocity of target object 104 relative to FMCW radar 102, DSP 306 generate a two dimensional range Doppler processing signal across fast time t and slow time l, (where slow time l is the time across the number of chirps L measured). This two dimensional range Doppler processing signal may be determined by demodulation unit 406 and may be expressed as:

$$b(t,l) = e^{j2\pi\left(\left(\frac{2KR}{c}+\frac{2KvlT_r}{c}+\frac{2f_cv}{c}\right)t+\frac{2f_cR}{c}+\frac{2f_cvlT_r}{c}\right)}.$$

Neglecting the frequency increase within a given chirp, the two dimensional range Doppler processing signal may be approximated as:

$$b(t,l) \approx e^{\frac{j4\pi(R+f_cvlT_r)}{c}}e^{j2\pi\left(\frac{2KR}{c}+\frac{2f_cv}{c}\right)t}.$$

In the conventional FMCW radar system 100, only the frequency bin corresponding to the range to the target object 104 is utilized for range gating. Hence, information present in any other frequency bin is completely ignored. Therefore, performance suffers. Here, demodulation unit 406 utilizes all frequency bins. In order to accomplish this, demodulation unit 406 removes the effect of range to target object 104 from the two dimensional range Doppler processing signal. First demodulation unit 406 may multiply the two dimensional range processing signal by the range term exponential to generate a multiplied two dimensional range Doppler processing signal, expressed as:

$$b(t,l) \times e^{-2\pi\left(\frac{2KR}{c}\right)t} = e^{\frac{j4\pi(R+f_cvlT_r)}{c}}e^{j2\pi\left(\frac{2f_cv}{c}\right)t}$$

where $$e^{-2\pi\left(\frac{2KR}{c}\right)t}$$

is the range term exponential. Thus, the multiplied two dimensional range Doppler processing signal comprises a velocity term $$\left(\text{i.e., } e^{j2\pi\left(\frac{2f_cv}{c}\right)t}\right)$$

and a phase shift term $$\left(\text{i.e., } e^{\frac{j4\pi(R+f_cvlT_r)}{c}}\right)$$

corresponding with the range to target object 104.

The multiplied two dimensional range Doppler processing signal then may be vectored, utilizing demodulation unit 406, to generate a one dimensional range Doppler processing signal, expressed as:

$$b(t+lT_r) = e^{\frac{j4\pi R}{c}}e^{j2\pi\left(\frac{2f_cv(t+lT_r)}{c}\right)}$$

where $(t+lT_r)$ is the continuous time parameter $\hat{t}$. Thus, the one dimensional range Doppler processing signal comprises a fixed phase term $$\left(\text{i.e., } e^{\frac{j4\pi R}{c}}\right)$$

and a time component and velocity term $$e^{j2\pi\left(\frac{2f_cv(t+lT_r)}{c}\right)},$$

which comprises the continuous time parameter and a velocity parameter). Hence, $$b(\hat{t}) = e^{\frac{j4\pi R}{c}}e^{j2\pi\left(\frac{2f_cv\hat{t}}{c}\right)}$$

Comparing the one dimensional range Doppler processing signal to the mixer output signal utilizing a conventional CW radar system $$\left(e^{j4\pi f_c\left(\frac{R}{c}+\frac{vt}{c}\right)}\right)$$

shows that the DSP 306 in FMCW radar 102 provides similar performance in quantifying velocity of target object 104 as the conventional CW radar. Thus, FMCW radar system 102 has the capability of providing higher velocity quantification performance than a conventional FMCW radar while still being capable of determining range, which a CW radar system is incapable of determining.

In an alternative embodiment, given the beat signal for L chirps:

$$b(t,l) \approx e^{\frac{j4\pi(R+f_c vlT_r)}{c}} e^{j2\pi\left(\frac{2KR}{c}+\frac{2f_c v}{c}\right)t}$$

the frequency of each chirp may be estimated using a fast Fourier transform (FFT) and averaged across the L chirps to generate a frequency estimate f1. The frequency f1 is an estimate of $$2\pi\left(\frac{2KR}{c}+\frac{2f_c v}{c}\right).$$

This frequency estimate may be utilized by demodulation unit 406 to demodulate the two dimensional beat signal above such that:

$$c(t,l)=b(t,l)e^{-j2\pi f1 t}$$

After demodulation, the mean of c(t,l) is determined for each l by averaging each chirp. Finally, another FFT may be performed on c(l) to find $$\frac{4\pi f_c vT_r}{c}.$$

The mean or c(l) may be removed prior to the performance of the FFT to avoid the effect of DC values on the estimation accuracy.

In certain embodiments, additional objects may be present than only target object 104. If the objects are found in multiple range bins, to obtain the Doppler shift corresponding to target object 104, a band reject filter (or multiple band reject filters), in DSP 306, may remove the signals received from the range bins containing the additional objects. In alternative embodiments, multiple target objects 104 may be present. With multiple target objects 104 present, the demodulation unit 406 may generate multiple beat frequencies. The demodulation unit 406 then may calculate or estimate, utilizing the process described above each of the Doppler frequencies corresponding to each of the target objects 104. From this, the velocities of each of the target objects may be quantified utilizing demodulation unit 406.

Figure 5:
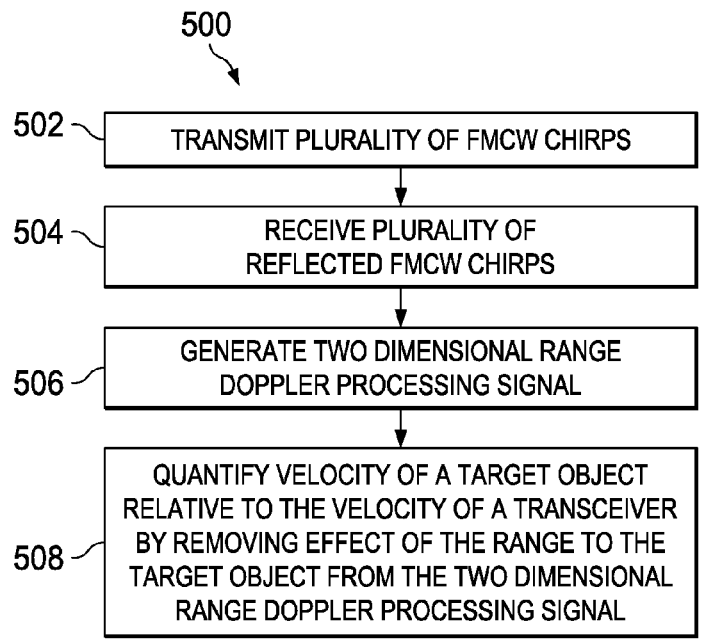
FIG. 5 shows a flow diagram of a method for quantifying a velocity of a target object utilizing FMCW radar.
Figure 6:
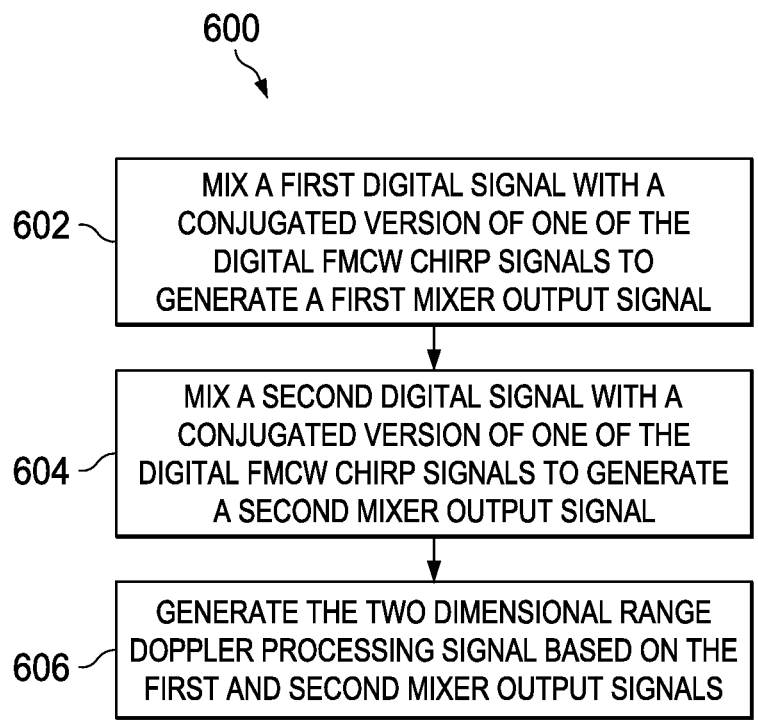
FIG. 6 shows a flow diagram of a method for generating a two dimensional range Doppler processing signal in accordance with various embodiments.
Figure 7:
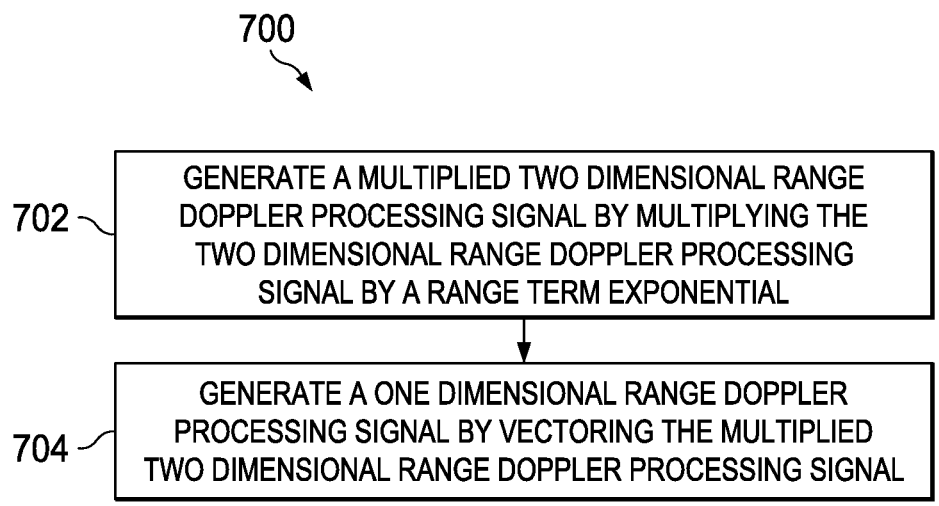
FIG. 7 shows a flow diagram of a method for quantifying a velocity of a target object utilizing FMCW radar.

FIGS. 5 and 7 show flow diagrams of methods 500 and 700 for quantifying a velocity of target object 104 utilizing FMCW radar 102 in accordance with various embodiments. FIG. 6 shows a flow diagram of a method 600 for generating a two dimensional range Doppler processing signal in accordance with various embodiments. Though depicted sequentially as a matter of convenience, at least some of the actions shown in methods 500, 600, and 700 can be performed in a different order and/or performed in parallel. Additionally, some embodiments may perform only some of the actions shown or may perform additional actions. In some embodiments, at least some of the operations of the methods 500, 600, and 700, as well as other operations described herein, can be performed by FMCW radar 102 and/or DSP 306 implemented by a processor executing instructions stored in a non-transitory computer readable storage medium or a state machine.

The method 500 begins in block 502 with transmitting a plurality of FMCW chirps by, in some embodiments, the transceiver 302 in FMCW radar 102. In block 504, the method 500 continues with receiving by, in some embodiments, transceiver 302, a plurality of reflected FMCW chirps 108. The reflected FMCW chirps 108 may comprise the plurality of FMCW chirps 106 after being reflected off of target object 104. The method 500 continues in block 506 with generating a two dimensional range Doppler processing signal, in some embodiments, utilizing DSP 306. More specifically, demodulation unit 406 may generate the two dimensional range Doppler processing signal. In block 508, the method 500 continues with quantifying the velocity of the target object 104 relative to the FMCW radar 102, in some embodiments relative to transceiver 302. In order to quantify the velocity of the target object 104 relative to the FMCW radar 102, the effect of the range to the target object 104 may be removed from the two dimensional range Doppler processing signal. This quantification may be performed by the DSP 306, and more specifically by demodulation unit 406.

The method 600 begins in block 602 with mixing one of a plurality of transmitted FMCW chirps 106 with one of a plurality of received reflected FMCW chirps 108 to generate a first mixer output signal. In some embodiments, this mixing may occur in transceiver 302. In block 604, the method 600 continues with mixing a second of the plurality of transmitted FMCW chirps 106 with a second of the plurality of received reflected FMCW chirps 108 to generate a second mixer output signal. In some embodiments, this mixing may also occur in transceiver 302. The method 600 continues in block 606 with generating a two dimensional range Doppler processing signal based on the first and second mixer output signals.

The method 700 begins in block 702 with generating a multiplied two dimensional range Doppler processing signal. This generation may be performed by multiplying the two dimensional range Doppler processing signal by a range term exponential by a mixer (multiplier) in demodulation unit 406 within DSP 306. In block 704, the method 700 continues with generating a one dimensional range Doppler processing signal. This generation may be performed by vectoring the multiplied two dimensional range Doppler processing signal in demodulation unit 406 within DSP 306. The one dimensional range Doppler processing signal then may be utilized to determine the velocity of target object 104 with respect to FMCW radar 102.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A frequency modulated continuous wave (FMCW) radar system, comprising:
a transceiver configured to transmit a plurality of FMCW chirps, receive a plurality of reflected FMCW chirps, and mix the plurality of reflected FMCW chirps with at least one of the plurality of FMCW chirps to generate a plurality of beat signals, the plurality of reflected FMCW chirps comprising the plurality of FMCW chirps after being reflected off of a target object;
an analog to digital converter (ADC) coupled to the transceiver, the ADC configured to convert the plurality of beat signals into a plurality of digital chirps; and
a digital signal processor (DSP) coupled to the ADC, the DSP configured to receive the plurality of digital chirps and quantify a relative velocity of the target object as compared to a velocity of the FMCW radar system by removing an effect of a range to the target object from a two dimensional range Doppler processing signal.

2. The FMCW radar system of claim 1, wherein the range corresponds to the range of the target object from the transceiver at a point in time.

3. The FMCW radar system of claim 1, wherein the DSP is configured to remove the effect of the range by multiplying the two dimensional range Doppler processing signal by a range term exponential to generate a multiplied two dimensional range Doppler processing signal comprising a velocity term and a phase shift term corresponding with the range.

4. The FMCW radar system of claim 3, wherein the DSP is further configured to remove the effect of the range term by vectoring the multiplied two dimensional range Doppler processing signal to generate a one dimensional range Doppler processing signal comprising a fixed phase term and time component and velocity term.

5. The FMCW radar system of claim 4, wherein the time component and velocity term comprises a continuous time parameter and a velocity parameter.

6. The FMCW radar system of claim 1, wherein the transceiver is further configured to:
mix a first of the plurality of reflected FMCW chirps with a conjugated version of one of the plurality of FMCW chirps to generate a first mixer output signal; and
mix a second of the plurality of reflected FMCW chirps with the conjugated version of one of the plurality of FMCW chirps to generate a second mixer output signal.

7. The FMCW radar system of claim 6, wherein the DSP is further configured to generate the two dimensional range Doppler processing signal based on the first and second mixer output signals.

8. The FMCW radar system of claim 6, wherein the DSP is configured to generate each of the plurality of digital chirps based on a time displacement of one of the plurality of reflected FMCW chirps relative to one of the plurality of FMCW chirps.

9. The FMCW radar system of claim 8 wherein the time displacement is based on velocity of the target object relative to the FMCW radar system.

10. A method for quantifying a velocity of a target object utilizing frequency modulated continuous wave (FMCW) radar, comprising:
transmitting, by a transceiver in a FMCW radar system, a plurality of FMCW chirps;
receiving, by the transceiver, a plurality of reflected FMCW chirps, the plurality of reflected FMCW chirps comprising the plurality of FMCW chirps after being reflected off of the target object;
generating a two dimensional range Doppler processing signal; and
quantifying the velocity of the target object relative to a velocity of the transceiver by removing an effect of a range to the target object from the two dimensional range Doppler processing signal.

11. The method of claim 10, wherein the generating the two dimensional range Doppler processing signal comprises:
mixing a first of the plurality of digital signals with a conjugated version of one of the plurality of digital FMCW chirp signals to generate a first mixer output signal; and
mixing a second of the plurality of digital signals with a conjugated version of one of the plurality of digital FMCW chirp signals to generate a second mixer output signal.

12. The method of claim 11, wherein the generating the two dimensional range Doppler processing signal further comprises:
generating the two dimensional range Doppler processing signal based on the first and second mixer output signals.

13. The method of claim 10, wherein the quantifying the velocity of the target object relative to a velocity of the transceiver comprises generating a multiplied two dimensional range Doppler processing signal by multiplying the two dimensional range Doppler processing signal by a range term exponential.

14. The method of claim 13, wherein the multiplied two dimensional range Doppler processing signal comprises a velocity term and a phase shift term corresponding with the range.

15. The method of claim 13, wherein the quantifying the velocity of the target object relative to a velocity of the transceiver comprises generating a one dimensional range Doppler processing signal comprising a fixed phase term and time component and velocity term by vectoring the multiplied two dimensional range Doppler processing signal, wherein the time component and velocity term includes a continuous time parameter and a velocity parameter.

16. A digital signal processor (DSP), comprising:
a receiving unit configured to receive a plurality of digital chirps corresponding to a plurality of beat signals; and
a demodulation unit coupled to the receiving unit, the demodulation unit configured to:
generate a two dimensional range Doppler processing signal corresponding to a range to the target object; and
quantify a velocity of the target object relative to a velocity of the DSP by removing an effect of the range to the target object from the two dimensional range Doppler processing signal.

17. The DSP of claim 16, wherein the demodulation unit is further configured to generate the two dimensional range Doppler processing signal by:
generating the two dimensional range Doppler processing signal based on a first and second mixer output signal, the first mixer output signal corresponding to a first of a plurality of reflected FMCW chirps mixed with a conjugated version of a first of a plurality of FMCW chirps, and the second mixer output signal corresponding to a second of the plurality of reflected FMCW chirps mixed with a second conjugated version of a second of the plurality of FMCW chirps.

18. The DSP of claim 16 wherein the demodulation unit is further configured to quantify the velocity of the target object relative to the velocity of the DSP by generating a multiplied two dimensional range Doppler processing signal by multiplying the two dimensional range Doppler processing signal by a range term exponential, the multiplied two dimensional range Doppler processing signal comprising a velocity term and a phase shift term corresponding with the range.

19. The DSP of claim 18 the demodulation unit is further configured to quantify the velocity of the target object relative to the velocity of the DSP by generating a one dimensional range Doppler processing signal comprising a fixed phase term and time component and velocity term by vectoring the multiplied two dimensional range Doppler processing signal, wherein the time component and velocity term includes a continuous time parameter and a velocity parameter.

20. The DSP of claim 16, wherein the range to the target object is a range to the target object at a point in time.

* * * * *